Aug. 11, 1964     F. K. DICKERSON     3,143,911
ROTARY NIBBLER
Filed July 28, 1961     2 Sheets-Sheet 1

INVENTOR.
FRANK K. DICKERSON
ATTORNEY

Aug. 11, 1964   F. K. DICKERSON   3,143,911
ROTARY NIBBLER
Filed July 28, 1961   2 Sheets-Sheet 2

INVENTOR.
FRANK K. DICKERSON
BY
ATTORNEY.

United States Patent Office 3,143,911
Patented Aug. 11, 1964

3,143,911
ROTARY NIBBLER
Frank K. Dickerson, Wichita, Kans., assignor to The Boeing Company, Wichita, Kans., a corporation of Delaware
Filed July 28, 1961, Ser. No. 127,566
10 Claims. (Cl. 83—350)

My invention relates to a new cutting system, herein termed "rotary nibbling," for cutting the edges of metal sheets and the like on a hand-fed spindle shaper. The edges of such metal parts are cut by being nibbled between cutting edges formed on a single buttress-like helical thread on a rotated nibbler body and formed on a bushing receiving the body.

Stainless steel and other high strength, high temperature resistant metal parts are not satisfactorily shaped on the hand-fed spindle shapers used for aluminum sheet. In advanced aircraft it is desired to use stainless steel, titanium and other materials that will withstand the higher temperature environments. These materials have properties making hand-fed shaping difficult that include low machinability factors, toughness, and work hardenability. Considerable effort is being expended in the aircraft industry in new methods of working these materials. I devised the system of rotary nibbling which is an improved means of cutting the edges of these metal parts, particularly on a hand-fed spindle shaper.

The objectives of my invention include: to devise a cutting system for high strength, high temperature ferrous and other sheet metals adapted for hand-fed spindle shapers and the like, to provide an improved nibbling system using a rotary threaded body, and to provide a practical method of hand-fed shaping and the like having suitable feed rates, producing acceptably smooth, straight edges, adaptable to manual feed of parts, having acceptable tool life, inexpensive in equipment requirements and in operating costs, etc.

Further advantages and objectives of my invention will be understood from the following description and from the drawings in which.

Aluminum sheet used for aircraft skins and for other applications has a high machinability factor. This material is successfully shaped by a hand-fed spindle shaper. The cutter can have a high rotational speed and this minimizes the manual effort required to feed the work to the spindle. The amplitude of intermittent cutting force, as the cutter strikes the work piece, is reduced by the high frequency contact resulting from high rotational speed. In other words, the amplitude of the cutting shock is inversely proportional to the frequency of contact between cutter lands and work piece.

Stainless steel has a very low machinability factor. Stainless steel would be most difficult to route under the same conditions used in aluminum because the cutter bit would burn up if rotated at high speeds or, if the speed of rotation of the cutter bit were reduced substantially below the speeds used for aluminum to minimize heating, the intermittent shock of impact of the cutter lands on the work piece would be too great compared with the feed force of the operator for hand feed to be practical. The major component of cutting force in conventional routing and shaping is perpendicular to the axis of the cutter bit and parallel to the direction of work feed, which accounts for the inability of an operator to handle low-frequency, high-impact cutting forces. This is not a problem in machine-fed machining of stainless steel and the like, and the rotary nibbler may have limited application to machine-fed operations, although such operations have problems in cutting high temperature metals even though low feed rates can be used.

In the present rotary nibbler the major component of cutting force is parallel to the axis of the cutter bit and perpendicular to the direction of work feed. Only a minor component of force is in the plane of the work and the operator can overcome this by normal hand feed effort. By resolving the feed problem, the rotational speed of the cutting tool can be reduced to a rate making the most practical compromise between cutting rate and cutter life.

Rotary nibbling is achieved by a nibbling action between threads of a cutter bit and the face of a bushing receiving the bit. Prior nibbling was a reciprocating shearing action between a punch and a die. No rotation between parts was present and no helical cutting surfaces were present. The present rotary nibbling cutting action between the cutter thread and the bushing edge is somewhat comparable to the action of a pair of scissor blades. It is a continuous progressive shearing action.

FIGURE 1

Figure 1:
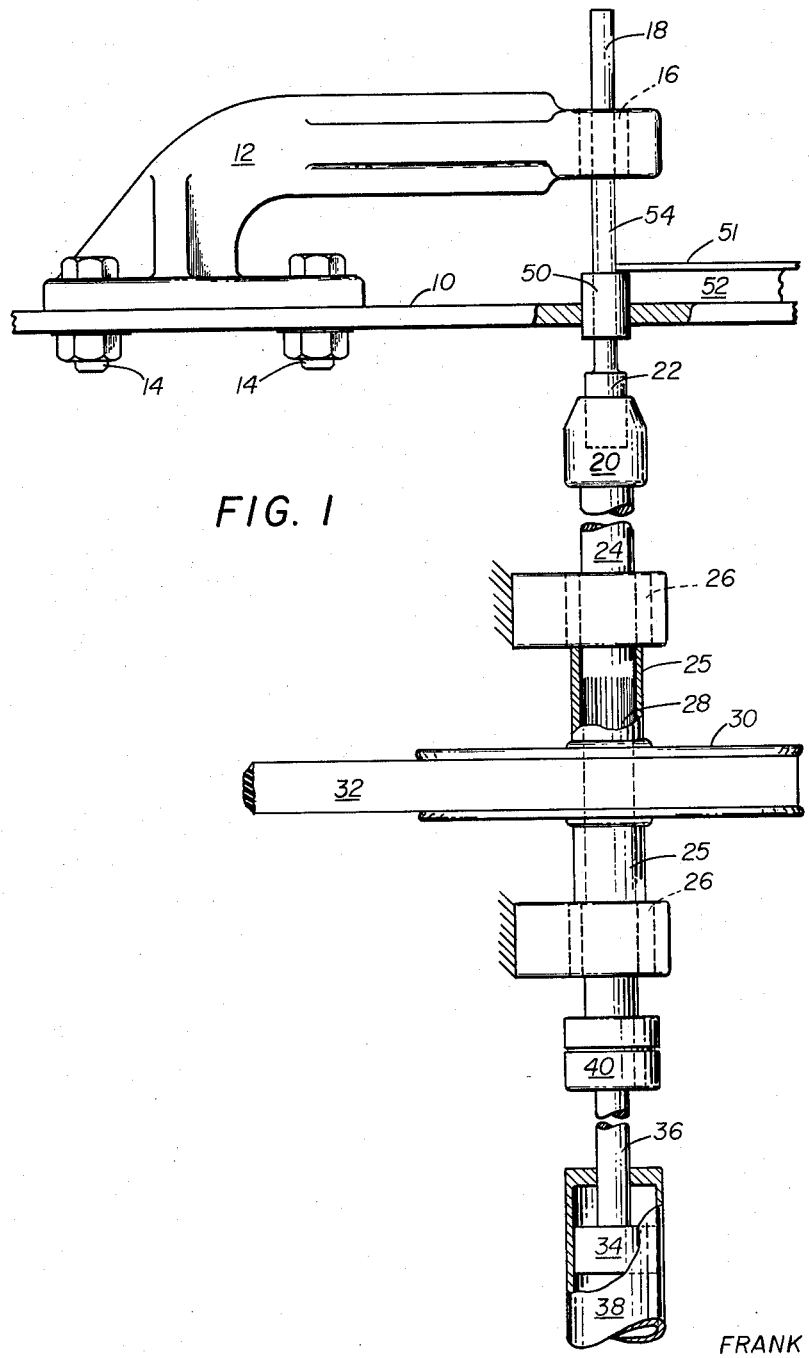
FIGURE 1 is an elevational view, partly schematical and partly in section, showing a specific embodiment of my rotary nibbler and associated equipment.

FIGURE 1 shows a specific embodiment of one supporting system for a rotary nibbler. It includes a table 10 and an upper support arm 12, secured to the table by bolts 14, having a sleeve bushing 16 receiving the upper end of an elongated nibbler body 18 free to rotate therein. A collet chuck 20 receives and secures a shank 22 on nibbler body 18. The chuck includes a supporting spindle shaft 24 supported by antifrictional bearings 26 in which shaft 24 has vertical movement. Shaft 24 has a splined portion 28 engaged with the V-pulley 30 of a power system rotating the shaft 24, thereby rotating nibbler body 18. A V-belt 32 connects with a motor not shown. Sleeve spacers 25, between each side of pulley 30 and bearings 26, position the pulley.

Vertical movement of the cutter is powered by a hydraulic motor having a piston 34, a piston rod 36 and a cylinder 38. Piston rod 36 is secured to shaft 24 by a swivel coupling 40. The hydraulic motor can be manually or automatically controlled. The purpose of the motor is to locate successive portions of the nibbler in engagement with the work to maximize cutter life. The vertical movement may be periodically locating the nibbler at a different level or may be continually, slowly reciprocating the cutter in bushing 50 to minimize heating of any threaded portion. Preferably the nibbler body is reciprocated vertically at a much slower speed than cutter thread travel so that the cutting action is not appreciably influenced by the reciprocating action.

It will be understood that the nibbler could be supported by different structure and could be supported at one or both ends. The nibbler body 18 could be horizontally disposed but most shaping operations are accomplished with vertical orientation of the cutter axis.

The rotary nibbler has been used with a part feed rate of 10 inches per minute with Type 321 annealed stainless steel. About 350 feet of material were cut before cutter reconditioning was required with a tool steel cutter. Carbide cutters have longer lives. With further advances, such as the use of heavy duty cutting oil containing antiweld agents, and improvements in cutter materials, a longer cutter life before reconditioning is to be expected. Speeds of rotation of 500 to 1500 r.p.m. were used in the example.

FIGURE 1 shows the use of bushing 50 as a guide for the fixture 52 on which the work 51 is mounted. In some types of shaping where the part has complex contour, shaping is accomplished by supporting the work 51 overhanging the edge of a fixture 52 having the shape of the desired part edge. In other applications where a strip or a sheet is to have a more or less straight edge cut, the work 51 may not be mounted on a fixture and guides may be established on the table 10 for pushing the work 51 past the cutter, in which case bushing 50 would not be used as a guide.

Whereas in this description the part sometimes has been called a metal sheet for convenient brief reference, the part may be a sheet, a complex part, usually of sheet metal thickness, or a strip. The material may or may not be of uniform thickness. Such strip may be an extrusion or may be a shape formed on a brake. Although this description for convenience has spoken of shaping (in which, in common usage, the part is first generally cut to size and then trimmed to final dimensions in a shaping operation), the term "shaping" should be taken as encompassing routing (in which the part blank is completely shaped in one operation by a deeper cutting operation).

FIGURE 2

Figure 2:
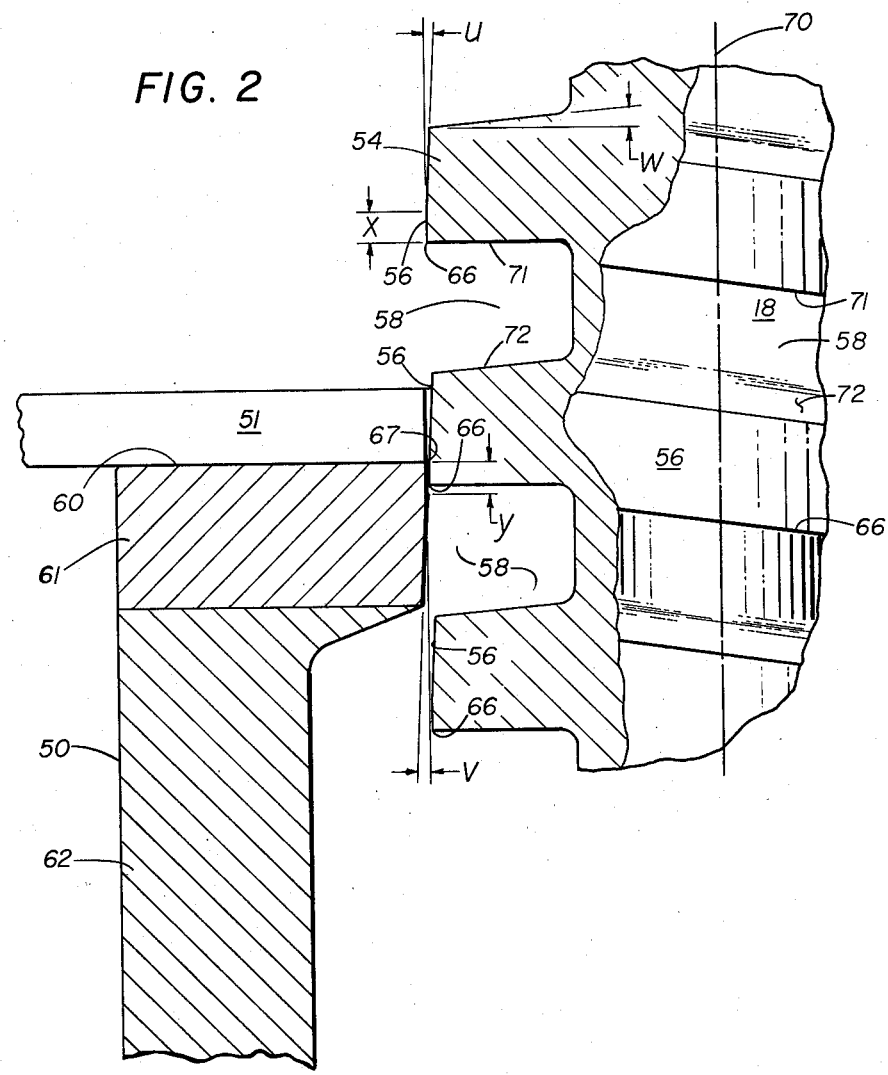
FIGURE 2 is an enlarged view of portions of the nibbler body, bushing, and a part being shaped, the showing being fragmentary and partly in section.

FIGURE 2 shows in more detail the construction of nibbler 18 and bushing 50. Nibbler 18 has formed in a portion thereof helical cutting means generally like and referred to herein as a single buttress helical thread 54, forming upper land surfaces 56 separated by spiral flutes 58. The body of nibbler 18 or at least the cutter portion thereof is formed of tool steel or carbide. The square configuration of the buttress-like thread maximizes strength and support of the effective cutting portions of the thread. Bushing 50 has a work-abutting face 60. Preferably the upper portion 61 of the bushing is formed of carbide, as indicated in the drawings, welded or otherwise secured to the main body portion 62.

Sharpened cutting edges 66 are formed at the sides of threads 54 facing the work-abutting face 60 of bushing 50. A sharpened cutting edge 67 is formed in bushing 50 at the edge of work-abutting face 60. The work 51 is nibbled as successive portions of thread cutting edges 66 pass cutting edge 67 of bushing 50 as nibbler body 18 is rotated. The relative movement between cutting edges 66 and 67 may be likened to the movement of scissor blades relative to a member being cut.

The maximum diameter portion of the thread is in the area $x$ adjacent cutting edge 66 and this maximum diameter portion has only a working clearance with the mini-minimum diameter portion $y$ of bushing 50. The working clearances are related to nibbler size, part thickness and the like but generally would be between 0.002 and 0.005". An upper limit of 0.010" may be used to define working clearance so as to distinguish any bushing used for a guiding rather than a cutting function or producing a rough cut with a heavy burred or wire edge.

The land 56 of thread 54 has radial clearance in back of portion $x$ at a small angle $u$ in the order of one degree. Likewise, the carbide portion of bushing 50 has radial relief away from portion $y$ in an angle $v$ of about one degree. The thickness of each area $x$ and $y$ in this specific example is about 0.020".

It will be understood that the dimensions of the nibbler will be somewhat responsive to the materials to be cut and their thickness, the materials used in constructing the nibbler and bushing, the speeds of cutting desired, and the helical angle of the threads. The width of the flutes 58 must be greater than that of the thickness of the part, of course, in order to accept the same. The wall 71 of flute 58 adjacent cutting edge 66 is preferably approximately perpendicular to the cutter axis 70 whereas the opposite wall 72 is shown as having an angle $w$ of about five degrees to normal to cutter axis 70.

If the cutting edges of thread and bushing were parallel and still could meet, the cutting edge 66 would approach the part parallel to the face thereof and this would be the optimum relationship for nibbling. Obviously, the cutting edges must be at an angle to each other and not parallel.

The greater the helical lead angle of the thread, the greater the feed force required to move the part past the nibbler and the greater the shock of impact to which the worker feeding the part is subjected. To minimize feed force and impact and to get the most favorable disposition of cutter and bushing cutting edges, the helical lead angle (or the pitch) should be the minimum value that permits reception of the part in the flute. Flute and land width, part thickness, and helical angle (or pitch) are related as to what that minimum value of helical lead angle can be.

From the foregoing, it will be understood that cutting is accomplished by the scissor action between the lands in the nibbler and the bushing. Chips cut by the nibbler (offal) are "augered" out the bottom of the bushing by action of the cutter lands and eventually fall free.

Upon each rotation of the rotary nibbler, one arcuate cut is made in the part. The arcuate cut may be termed a continuous progressive shearing action. The hand pressure on the work then advances another section of the material into the nibbler flute and another arcuate cut is made. The rate of rotation is high relative to the feed of the part so the arcuate cuts are closely spaced and a straight cut is satisfactorily simulated although the aruate cuts would have to be infinite to produce a straight line on the part.

Having thus specifically described my invention, I do not wish to be understood as limiting myself to the precise details of construction shown, but instead wish to cover those modifications thereof which will occur to those skilled in the art from my disclosure and which fall within the scope of my invention, as described in the following claims.

I claim:
1. A rotary nibbler operative to shape metal sheets and parts, comprising:
   an elongated nibbler body;
   support means rotatably supporting said body at least at one end;
   a stationary bushing supported and secured in position by said support means and receiving a portion of said nibbler body;
   said bushing having a flat work receiving face disposed in a plane substantially at right angles to the axis of said nibbler body forming a surface for supporting such metal sheets and parts as they are fed to said nibbler body;
   said bushing having a sharpened cutting interior edge bordering said work receiving face;
   said nibbler body having a portion thereof formed with a helical thread generally like a single buttress thread, forming land surfaces separated by spiral flutes;
   said helical thread partly being disposed in said bushing and partly being disposed at the end of said bushing having said work receiving face whereby as the nibbler body is rotated such metal sheets and parts are cut as they are supported on said work receiving face and fed to said nibbler body;
   said thread having a sharpened cutting edge on its side toward said work receiving face of said bushing, said cutting edges on said thread and said bushing having only operating clearance, said thread and said bushing having radial clearances back from said cutting edges; and
   power means connected with said nibbler body operative to rotate said body in a direction so that said cutting edge of said thread moves toward said work receiving face of said bushing.

2. A rotary nibbler operative to shape metal sheets and parts, comprising:
   a nibbler body;
   support means rotatably supporting said body at least at one end;

a bushing supported and secured in position by said support means and receiving a portion of said nibbler body;

said bushing having a flat work receiving face disposed in a plane substantially at right angles to the axis of rotation of said nibbler body forming a surface for supporting such metal sheets and parts as they are fed to said nibbler body;

said bushing having a sharpened cutting interior edge bordering said work receiving face;

said nibbler body having a portion thereof formed with a helical thread having a flute in which such metal sheets and parts are engaged;

said helical thread partly being disposed in said bushing and partly being disposed at the end of said bushing having said work receiving face whereby as the nibbler body is rotated such metal sheets and parts are cut as they are supported on said work receiving face and fed to said nibbler body;

said thread having a sharpened cutting edge on its side toward said work receiving face of said bushing, said cutting edges on said thread and said bushing fitting closely enough together to perform a nibbling operation on such metal sheets and parts engaged in said flute; and power means connected with said nibbler body operative to rotate said body in a direction so that said cutting edge of said thread moves toward said work receiving face of said bushing.

3. The subject matter of claim 2 in which said bushing has an annular exterior edge bordering said work receiving face forming a guide for fixtures on which work may be mounted whereby the contour of such metal sheets and parts shaped by the nibbler may be determined by the contour of the edges of such fixtures abutting said annular exterior edge.

4. A rotary nibbler operative to shape metal sheets and parts, comprising:

a nibbler body;

support means rotatably supporting said body at least at one end;

a bushing supported and secured in position by said support means and receiving a portion of said nibbler body;

said bushing having a flat work receiving face disposed in a plane substantially at right angles to the axis of said nibbler body forming a surface for supporting such metal sheets and parts as they are fed to said nibbler body;

said bushing having a sharpened cutting interior edge bordering said work receiving face;

said nibbler body having a portion thereof formed with a helical thread generally like a single buttress thread, forming land surfaces separated by spiral flutes;

said helical thread partly being disposed in said bushing and partly being disposed at the end of said bushing having said work receiving face whereby as the nibbler body is rotated such metal sheets and parts are cut as they are supported on said work receiving face and fed to said nibbler body;

said thread having a sharpened cutting edge on its side toward said work receiving face of said bushing, said cutting edges on said thread and said bushing fitting closely enough together to perform a nibbling operation on such metal sheets and parts engaged in said flutes; and power means connected with said nibbler body operative to rotate said body in a direction so that said cutting edge of said thread moves toward said work receiving face of said bushing.

5. The subject matter of claim 4 in which said support means includes means operable to move said nibbler body axially relative to said bushing to locate various parts of said thread in nibbling position to distribute wear.

6. A nibbler for shapping a metal work part, nibbler body means having a longitudinal nibbler axis, said body means having a spiral flute formed therein defining helical thread means, said flute having one helical side wall formed at an angle intersecting said nibbler axis, said helical thread means having one external peripheral surface land portion parallel to said nibbler axis and intersecting said one flute wall to form an helical first cutting edge, the balance of said peripheral surface land portion of said helical thread means being relieved at a small reilef angle, and means forming a metal work part support and a second cutter edge adapted to cooperate with said first cutter edge to nibble said metal work part in a scissor-like fashion when at least one of said cutter edges is moved, said second cutter edge means being formed with a work supporting end face disposed at an angle intersecting said nibbler axis and with a curved wall portion intersecting said end face.

said second cutter edge being closely disposed to said first cutting edge within 0.010 inch thereof, at least a part of said curved wall portion being relieved at a small relief angle away from said second cutting edge, said work supporting end face of said metal work part support means being adapted to support said metal work part in such a manner as to prevent said metal work part from being conveyed by said nibbler body means away from said work supporting end face, and said first and second metal cutting edges being formed of a metal cutting material.

7. A nibbler as set forth in claim 6, wherein said second cutter edge means is a bushing encircling said nibbler body means and its cutting edge is circular.

8. A nibbler as set for in claim 7 further comprising, bearing guide means supporting and guiding said nibbler body means in a desired position, drive means for turning said nibbler body means, and adjustable means having a movable member connected to said nibbler body means for shifting the same along said nibbler axis.

9. A nibbler as set forth in claim 6, wherein said flute has a second side wall disposed at an angle intersecting said nibbler axis and sloping outwardly at an increasing distance from said first side wall of said flute, and wherein said flute has an helical bottom wall connecting with said side walls of said flute.

10. A rotary nibbler for shaping a metal work part, elongated nibbler body means having an elongated nibbler axis, said body means having a spiral flute formed therein defining a single buttress helical thread means, said flute having one helical flat ribbon-like side wall formed perpendicularly to said axis, said helical thread means having an external peripheral surface land portion formed parallel to said axis and intersecting said one flute wall perpendicularly to form a first cutting edge, the balance of said peripheral surface land portion of said helical thread means being relieved away from said first cutting edge and having a relief angle of approximately 1° and means forming a second cutter edge adapted to cooperate with said first cutter edge to nibble said metal work part in a scissor-like fashion when said nibbler body means is rotated, said second cutter edge means being formed by a work supporting end face defining a plane intersecting said axis and a curved wall portion intersecting said work supporting end face and closely disposed to said first cutting edge within 0.010 inch thereof,
said curved wall portion being relieved at an angle of approximately 1° away from said second cutting edge,
said work supporting end face of said second cutter edge means being adapted to support said metal work part in such a manner as to prevent said metal work part from being conveyed by said nibbler body means away from said work supporting end face, and said first and second metal cutting edges being formed of a metal cutting material.

References Cited in the file of this patent
UNITED STATES PATENTS

| | | |
|---|---|---|
| 1,675,067 | Tschantz | June 26, 1938 |
| 2,468,613 | Bjorklund | Apr. 26, 1949 |
| 2,610,685 | LeBron et al. | Sept. 16, 1952 |